Oct. 19, 1971  K. HÄNSGEN ET AL  3,613,139
SELF-PROPELLED FLOATING STRUCTURE
Filed Aug. 7, 1969  5 Sheets-Sheet 1
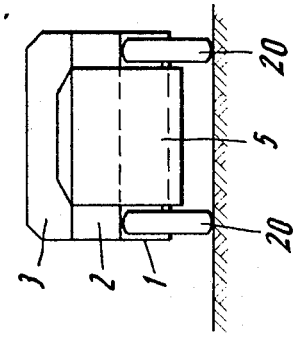
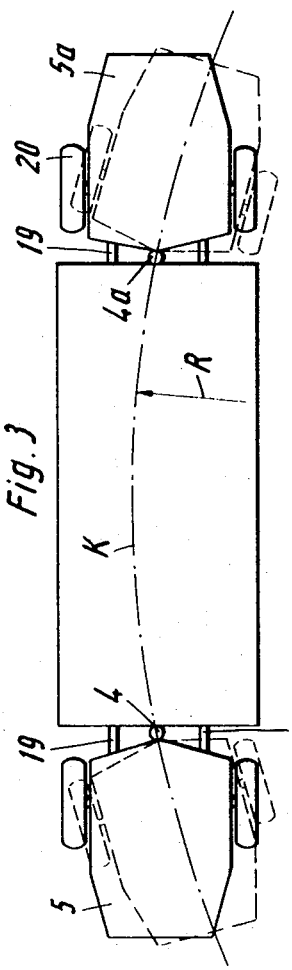
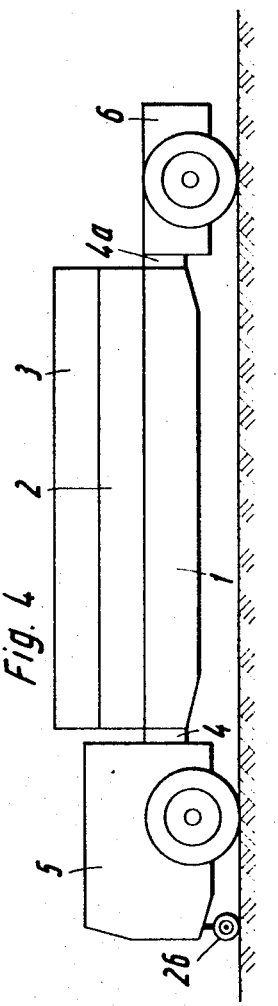
Inventors:
Klaus Hänsgen
Fritz Kinzler
Hans Werner Spohr
ATTORNEYS

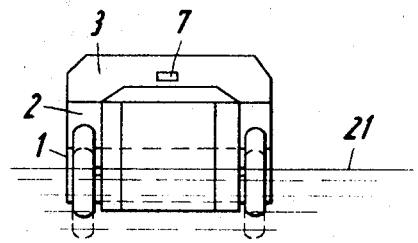
Fig. 5
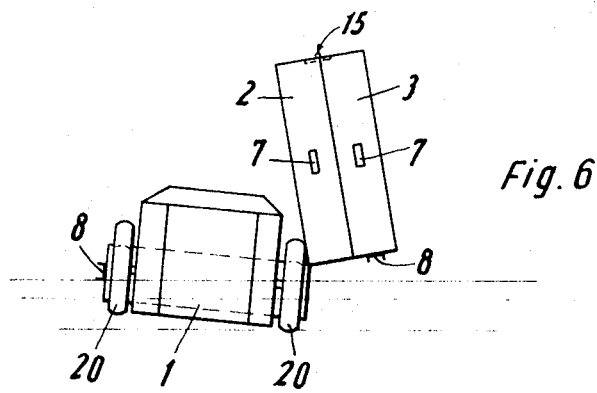
Fig. 6
Fig. 7
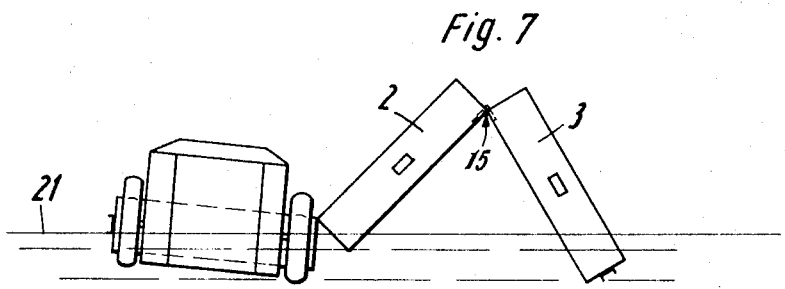
Fig. 8
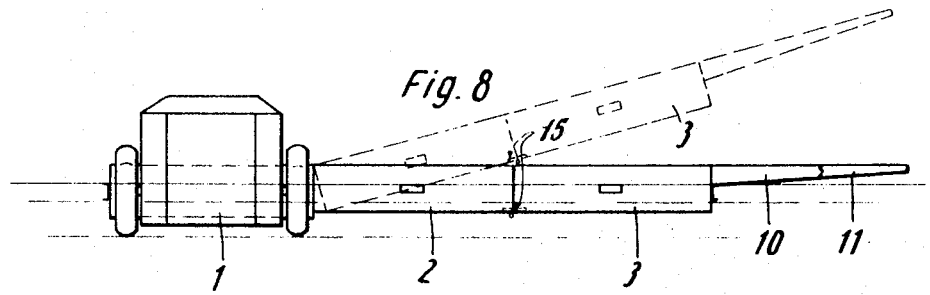

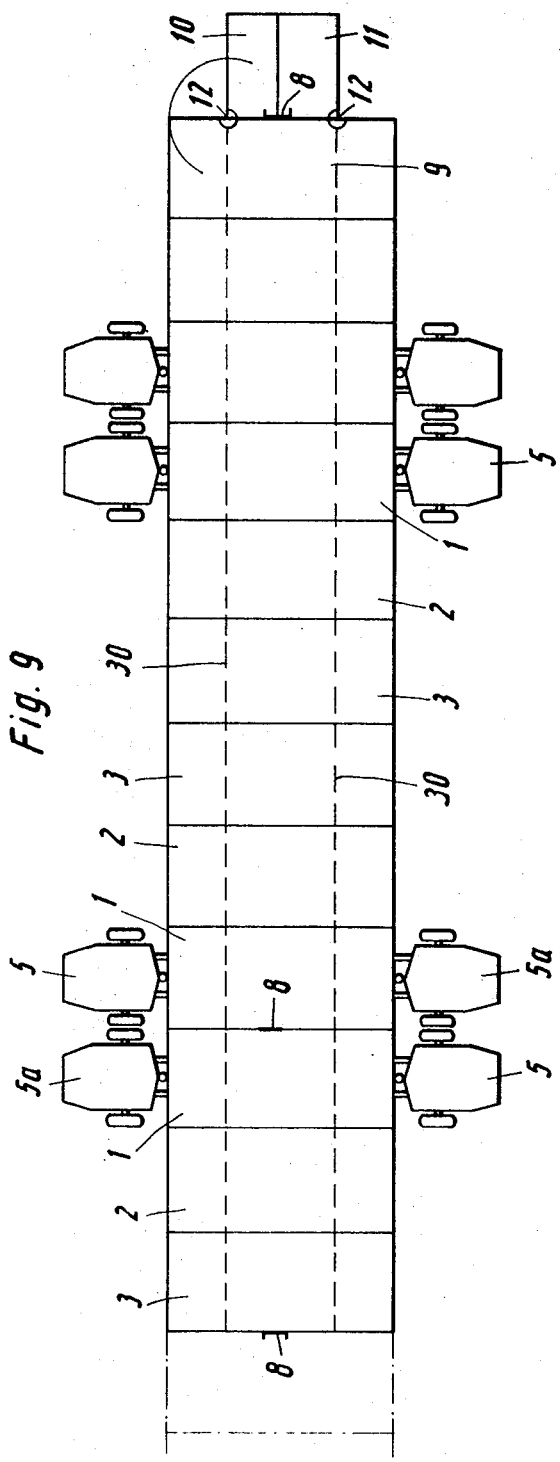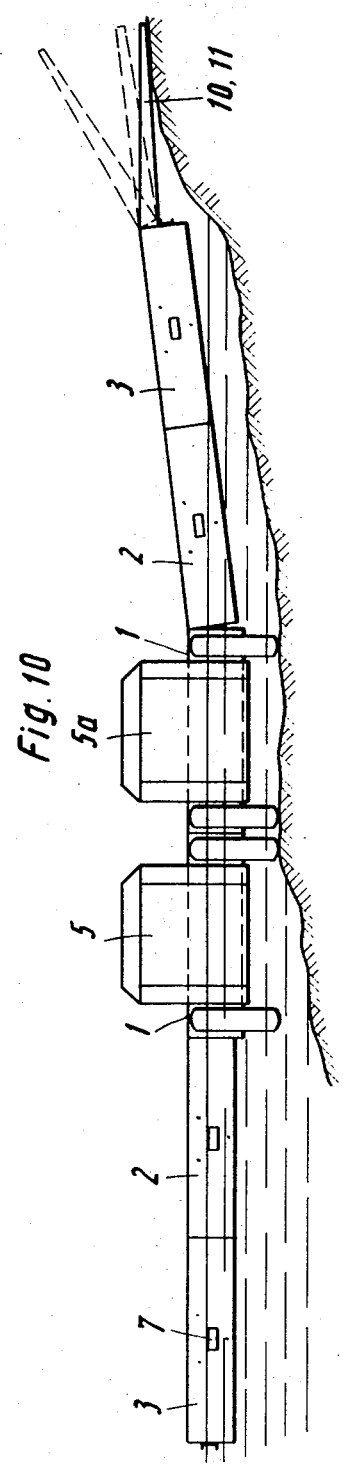

Oct. 19, 1971     K. HÅNSGEN ET AL     3,613,139
SELF-PROPELLED FLOATING STRUCTURE
Filed Aug. 7, 1969     5 Sheets-Sheet 4
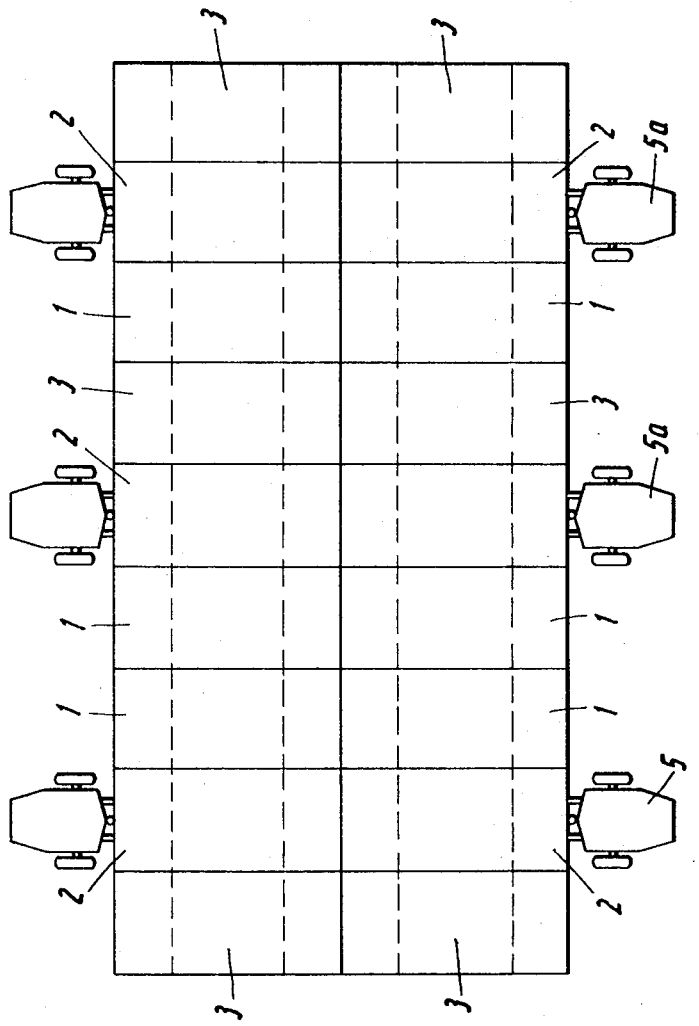
Inventors:
Klaus Hånsgen
Fritz Kinzler
Hans Werner Spohr

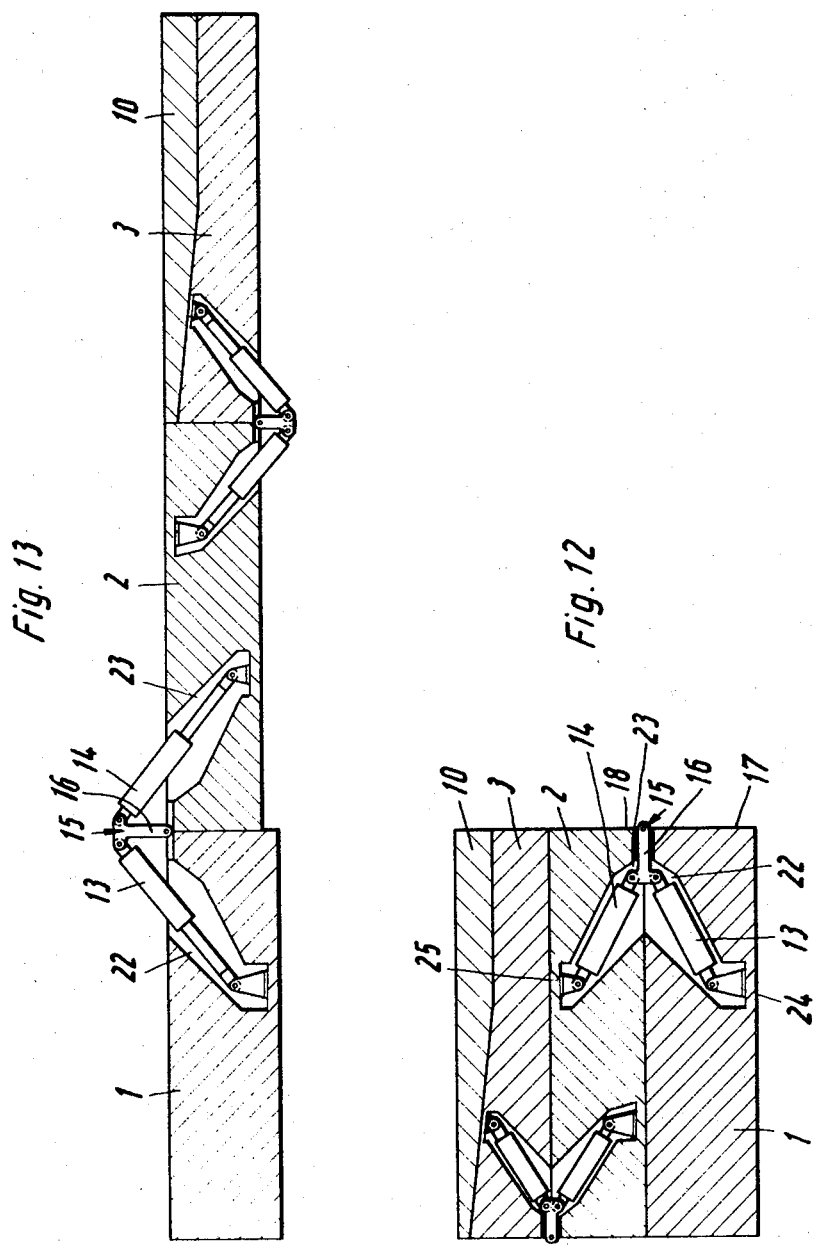

3,613,139
SELF-PROPELLED FLOATING STRUCTURE
Klaus Hänsgen, Witten, Fritz Kinzler, Dusseldorf, and Hans Werner Spohr, Willich, Germany, assignors to Firma Mannesmann Aktiengesellschaft, Dusseldorf, Germany
Filed Aug. 7, 1969, Ser. No. 848,319
Claims priority, application Germany, Aug. 14, 1968, P 17 81 060.5; Mar. 14, 1969, P 19 13 967.4
Int. Cl. E01d 15/08
U.S. Cl. 14—27
14 Claims

ABSTRACT OF THE DISCLOSURE

A three-float collapsible unit with amphibious drives is disclosed, the floats being hinged to permit vertical stacking for overland transport and horizontal unfolding to form a platform.

---

The present invention relates to self-propelled floating structure such as a ferry and floating bridge which can also be transported over land. More particularly the invention relates to a floating structure in which the raft-like portion is composed of several floatable bodies or elements which are pivotally linked together. These floatable bodies are in the following called floats. The plurality of floats can assume an unfolded position to establish an extended floatable structure which is resistive against bending, and wherein the floats can be locked together to establish a platform. The several floats are, so to speak, folded together for overland transport.

It is an object of the present invention to provide floating equipment which constitutes uniform structure and can be moved in a folded position overland as well as in water, and which can operate as a ferry, as part of the ferry, as a bridge, or part of a bridge, as a ramp, or the like, whereby preferably the same motion power plant is used for driving the equipment on land and propelling the floating structure through water and in extended position.

In accordance with one aspect of the present invention, in the preferred embodiment thereof, it is suggested to provide a plurality of floats, for example, as parallelepipeds having upper and lower horizontal surfaces as largest sides, and vertical front faces and long sides, hinged together along registering or juxtaposed pairs of, for example, long side edges. There may be contour deviation from a strictly parellelepided configuration, but it is convenient to picture these floats in that manner for reasons of orientation. In the folded position the floats are vertically stacked, in the unfolded position they extend horizontally from each other without any individual float changing its horizontal orientation as to its largest sides.

Considering the stacked position relation of the floats, the hinge pattern is as follows: The lowermost one of the floats is hinged to the next one above along registering long juxtaposed edges; a third float on top of the middle one is hinged thereto along long juxtaposed edges, the participating edge of the middle float being diametrically positioned to the edge with which it is hinged to the lowest float. Long sides of the floats having hinge edges are flush in the stacked position, but bear against each other when the structure is unfolded to form an extended raft or floating platform. There remain two long sides, one of the principal float, and one of the upper or outermost float which do not have hinges and are not covered when the structure is unfolded, but form vertical sides of the floating structure. The other vertical sides of the unfolded structure are formed by aligned front sides of the floats.

The float which is the lowest one in the folded and stacked position of the floating structure is also the principal float, the others on top are called auxiliary floats.

The two vertically oriented front sides of the principal float, are releasably coupled to amphibious vehicles which include at least one tractor. The tractor can be driven overland but can also propel itself as well as the floating structure through water. For motion on land, the amphibious vehicle can have wheels or caterpillars; for motion through water the amphibious tractor may have jets or propeller drives. A unit system may include two amphibious tractors or one amphibious tractor and an amphibious trailer for balancing.

Normally, a tractor is coupled to a front side of the principal float. In accordance with further development of the invention, the front sides of the auxiliary floats are provided with similar couplings for selective coupling to the swimming tractor to permit better maneuvering of the unfolded floating structures. This may be of interest, particularly in cases when several of the floating structures are to be joined to form larger floating platforms and for proper balancing of the entire floating combination in accordance with special conditions under which it is used.

The structural combination of the several floating structure units is further facilitated in that actually all vertical and outward sides of the several floats are provided with couplings for linking several floating structure units in accordance with a desired pattern for establishing large floating platform.

In accordance with a further feature of the invention, additional planks are linked to the outwardly directed, vertical long side of the outer auxiliary float to establish a pivotable ramp for permitting vehicles such as tanks and the like to be driven onto the float. These planks pivot preferably around vertical axes and fold back into the outermost float. These axes are arranged for flanking the runway on the extended unfolded floating structure; when swung out, the planks are interconnected to form the ramp having width at least equal to the width of the runway on the floating structure. This ramp may additionally pivot about a horizontal axis to adapt the float to the elevational differences.

The principal float is linked to the inner or middle auxiliary float and the latter one is linked to the outer auxiliary float by means of controlled hinges. There are regular hinges and control is provided by hydraulic actuators arranged in pairs for respective cooperation with a pivotable and hinged support. A hinged support pivots on the same axis along which the two floats are hinged together but independently therefrom, except for linkage to hydraulic actuators.

In particular, the floats are provided with slots, whereby slots of juxtaposed floats, when folded, assume registering position. Hydraulic actuators are positioned in the recesses for coaction with the hinged supports, while bearing against the respective bottoms of the recesses. Each hydraulic actuator acts on the respective other float through the hinged support. The hydraulic actuators each include a cylinder and piston arrangement, one thereof, piston or cylinder, being pivotally linked to the respective bottom of a recess, the other one, cylinder or piston, being pivotally linked to the hinged support. The bottom connection is rather remote from that side of a float which bears against a corresponding side of the other float to which it is hinged.

The structure principle of the hinged support is based on the presentment of a triangle with equal legs and defined in any plane normal to the hinge axis by the traversing point of the hinge axis as apex by the two pivot axes for the connection to the two hydraulic actuators, the latter points form the base of the triangle. The direction of actuation or piston displacement of a hydraulic actuator is selected and oriented never to be in line with the apex of that triangle along a leg thereof. The two hydraulic actuators, particularly when beginning to unfold two hinged floats have a larger angle than the apex angle of that triangle. This is only a different way of saying that the direction of actuation of the hydraulic linkage never traverse or intersect the hinge axis during folding and unfolding. The hinged support has preferably T-shaped configuration.

The amphibious vehicles are of the uniaxial type. Steering of a tractor is provided by pivoting the tractor relative to the principal float about a vertical axis through hydraulic control. The tractor has preferably retractable wheels or caterpillars, and preferably an independently retractable auxiliary wheel or wheel pair is provided to permit a tractor to be driven independently, i.e., when decoupled from the float, for repairs or for maneuvering, exchange, etc. Floats and amphibious vehicles, each are provided with tanks or compartments filled with hard low density foam of a suitable plastic having noncommunicating pores.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates schematically a side elevation of a folded floating structure with two amphibious tractors for self-propelled overland transportation;

FIG. 2 is a front view of the structure shown in FIG. 1;

FIG. 3 is a top view of the structure shown in FIGS. 1 and 2;

FIG. 4 is a view similar to FIG. 1 but with one amphibious tractor and one amphibious trailer;

FIGS. 5 through 8 are views comparable to FIG. 2 but showing progressive phases of unfolding;

FIG. 9 illustrates a top elevation of a ferry composed of few structures of the type shown in FIGS. 1 to 3;

FIG. 10 is a side view of a floating platform with ramp;

FIG. 11 is a top view of a platform using six structure units of the type disclosed in FIGS. 1 through 8; and FIGS. 12 and 13 are similar cross sections through the three floats exposing the folding mechanism, with FIG. 12 showing the folded and FIG. 13 the unfolded position of the three floats.

FIGS. 1 and 3 illustrate floating structure in collapsed, folded condition for overland transportation. In essence, the structure is comprised of a principal floatable body 1, or float for short, supporting two auxiliary floats 2 and 3. From an overall point of view these floats 1, 2 and 3 are parallelepipeds each having flat, horizontally oriented upper and lower sides; more or less vertically oriented front and rear sides (or a pair of front sides, as there is no preferred direction of propagation along the long axis of the parallelepipeds), and there are vertically oriented long sides extending in the direction of that longitudinal axis of overland propagation. Each float is a tank or container which is closed or is provided wth closed compartments to exhibit the desired degree of buoyancy. The floats may be filled with a hard, low density foam having closed, essentially noncommunicating pores.

Two tractors 5 and 5a are releasably coupled to the principal float. The couplings are schematically indicated at 4 and 4a. The tractors are of similar construction. As each of the tractors is uniaxial, a pair of tractors is needed for balanced support during overland transport.

At least one, preferably both tractors permit steering relative to the folded structure 1, 2, 3, as assembled for land transport. For this, couplings 4 and 4a permit tractors and floating body 1 to turn or pivot relative to each other, in a horizontal plane, i.e., about vertical axes. For steering there are provided hydraulic control pistons and cylinders 19 which are operated and controlled from the tractors 5 and 5a.

In FIG. 3 the dash-dot line delineates a portion of a circle K having a radius or curvature R. FIG. 3 illustrates further the relative position of the two tractors in dotted lines in order to steer the structure along a travel path on the circle K.

For exended travel it is possible to arrest the control cylinders 19 associated with second tractor 5a for straight forward driving. In this case, one man, sitting in the tractor 5, can drive the equipment. In case the equipment has to negotiate steep inclines, it may be advisable to use the engine of the second tractor 5a as auxiliary drive so as to assist the engine of tractor 5.

Reference numeral 20 refers to the wheels of the several tractors. The wheels are positioned for retraction. Each of the tractors 5, 5a is actually an amphibious vehicle for riding overland as a land vehicle on the extended wheels 20. In the alternative the vehicle may have caterpillars. In addition, the tractors should be provided with propeller, such as 31, jets, or the like, to propel a tractor through water as a boat. Conveniently, the same engine in a tractor may selectively drive wheels or propeller thereof.

A tractor may have sufficient buoyancy on its own to keep afloat with or without coupling to float 1. Thus, the tractors are provided with chambers acting as buoyancy tanks. They may have the same filling as floats 1, 2 and 3.

In order to permit an individual tractor to move about on its own, it is provided with a retractable, auxiliary wheel 26, or a pair of wheels. Wheel 26 is extended in case the tractor is driven by itself but is retracted for transportation rides together with a second tractor. Of course, then floating wheel 26 should also be retracted.

FIG. 4 illustrates a modification of the arrangement shown in FIGS. 1 and 3. In this case there is a single tractor 5 coupled to the arrangement of floats 1, 2 and 3 as prime mover. To the rear of the equipment there is an amphibious trailer 6 for balancing the support of the floating devices on wheels.

FIGS. 5 through 8 illustrate individual phases for unfolding the equipment from the collapsed position to gradually establish a floating platform. There are provided hinges 15 along two juxtaposed edges of long sides, respectively, of floats 2 and 3, and there are corresponding hinges between long edges of two long sides of floats 1 and 2, involving the other long side of middle float 2. In general, reference numeral 21 refers to the water line in each of these figures.

FIG. 5 shows floats 1, 2 and 3 stacked as during the overland transport. At first, still as shown in FIG. 5, the equipment is driven directly into the water, i.e., the amphibious tractor is partially submerged. As soon as the desired position has been obtained, the wheels of the tractors, or of tractor and trailer, are retracted. Next, the auxiliary floats 2 and 3 are pivoted by means of hydraulic equipment to be described more fully below for unfolding the floating equipment. The FIGS. 6, 7 and 8 illustrate successive phases of this unfolding process. As shown in FIG. 8, in particular, the two auxiliary floats 2 and 3 have now been horizontally aligned with each other as well as with the principal float 1. In this position, they are locked together.

As can be seen from the geometry involved, the principal float can be thicker, i.e., may have greater height than the auxiliary floats which is beneficial as the principal float 1 can also be regarded as the main platform for overland transport and may have additional storage compartments, etc. On the other hand, the auxiliary floats must have height which is equal among themselves as the resulting platform should have a smooth, stepless, top surface.

It should be noted that in the unfolded position, the tractors are asymmetrically coupled to the three floats, as the tractors are coupled to float 1. For reasons of better maneuverability or for any other reason, it may be desirable to couple the tractors to a different float, for example, to the middle one for reasons of symmetry and balance, or to the outer one (3) for reasons of turning and reorienting the floating platform in the horizontal, etc.

The front sides of the auxiliary floats 2 and 3 are provided with couplings 7, so that these floats individually, or the assembled float as a whole can be coupled therewith to the floating tractor or another tugboat, or the like. In order to provide coupling between different floating units as described (a unit being a three-float assembly as shown in FIGS. 1 through 8), the outwardly directed long side of auxiliary float 3 and the respective opposite facing, long side of the principal float can be provided with couplings 8. Actually, the couplings 7 and 8 can be similar, to permit assembly of larger floating platforms from different units in any desirable patterns as will be described below.

FIG. 9 illustrates a top elevation of an assembly of four floating structure units of this type to form an extensive ferry. The dash-dot lines of FIG. 9 show how the floating assembly can be enlarged further to form a rather long floating ferry or bridge. FIG. 10 illustrates a side elevation of a two-unit assembly, but can be conveniently construed as side elevation of the righthand portion of FIG. 9. In these embodiments couplers 8 are used to couple different three-float units together.

The dashed lines 20 in FIG. 9 outline schematically a boarder, such as boarder markings, for confining the driveway over and along the several floats. Heavy equipment, such as tanks or the like, should be maintained in central position in relation to each of the floats and to the floating structure as a whole. Thus, such vehicles should be driven essentially along the confines of these boundaries to stay on a horizontal line of symmetry for better maintaining balanced horizontal position of the equipment as a whole.

Nevertheless, it should be pointed out that a turning over of the floating structure constructed in accordance with the present invention can hardly be expected, because the amphibious tractors remain coupled to the floats, and inherently they are positioned in symmetry to the center line of the main driveway established therewith. Therefore, the amphibious tractors serve in effect the additional function of outriggers and particularly of symmetrical outriggers to stabilize the equipment as a whole.

Turning back for a moment to FIG. 8, there are illustrated in addition juxtaposed planks 10 and 11 which are pivotably linked to the outer auxiliary float 3. Planks 10 and 11 pivot around vertical axes to be folded into float 3 as shown in FIG. 12 or 13 and they can be folded to extend outwardly from float 3 as a ramp, as shown in FIGS. 8, 9 and 10.

It is a feature of the invention that not only planks 10 and 11 alone, but planks 10 and 11 together with auxiliary floats 2 and 3 can be used as a ramp. This is already indicated in dotted lines in FIG. 8, for example, but also in FIG. 10, in the righthand portion thereof, illustrating an extended ramp which includes auxiliary floats as well as planks 10 and 11. In particular, the hinge for floats 1 and 2 can be used to establish the transition from a general horizontal position of a floating platform to a smoothly inclining ramp to bridge a more or less steep bank along the shore.

As can be seen particularly from FIG. 9, the planks 10 and 11 have vertical pivotal axes on corners 12. The outer float 3 is provided with suitable recesses, outside of the area delineated by boundary 20, to receive planks 10 and 11 when folded back. In the enfolded position as illustrated, planks 10 and 11 are coupled together to form a ramp as stated. This ramp may additionally be equipped for pivoting about a common horizontal axis, so that actually horizontally ending shafts are provided for pivoting around vertical axes, and the two planks are respectively linked to these shafts for pivotal motion about horizontal axes, which are aligned when the planks have the unfolded position as shown in FIG. 9. Pivoting of a plank about a horizontal axis is schematically indicated in FIG. 10.

Local variations in the conditions under which the equipment is used and operated are readily accommodated by lifting the auxiliary floats 2 and 3 near the shore. Utilization of floats as an extended ramp is of particular advantage in case the unit cooperates with other three-float units to establish a large platform, as shown in FIG. 9 or 10.

In FIG. 10 the two principal floats 1 of the two units are coupled together. The three floats of the unit to the left plus the principal float of the second unit to the right constitute the horizontal floating platform proper, and the swung up auxiliary floats with extending planks 10, 11, establish the extended ramp to provide a smooth transition between shore bank and main platform at a lower level than the bank. The second unit constituting the main platform is additionally operative for balancing particularly during lifting floats 2 and 3 before resting on the shore ground.

Generally, one can see from FIGS. 9 and 10 that a large floating platform can readily be assembled, and the nearest one to shore is then shifted close to the shore line; floats 2 and 3 are lifted in unison, and planks 10 and 11 are pivoted up even further. When a suitable position above the bank has been reached, planks 10 and 11 are lowered so that their upper surface becomes coplanar with the upper surface of aligned floats 2 and 3, and still thereafter the entire extending ramp 2–3–10–11–13 lowered until the planks rest on ground.

Turning now to FIG. 11 there is illustrated schematically another mode of utilizing the equipment in accordance with the invention. In this case, six units of the three-floats-type are coupled together, using all of the short sides of the several floats on one sider thereof. Normally a three-float unit is coupled to two tractors 5 and 5a. In this case now, half of the tractors (or all other trailers) have been removed, so that one entire line of short sides of the floats can be linked to floats or other units, one each per float. This way, of course, a ferry or floating platform of double width can be established. The resulting rather broad platform can be used as landing area for heavy helicopters. Furthermore, this figure shows also that all the remaining tractors have been uncoupled from the principal floats and shifted to be coupled to the middle one of each three-float unit. This way more balanced structure is obtained, wherein the tractors are spaced regularly along, what are now the long sides of the entire platform.

After having described various possibilities of utilizing the equipment in accordance with the invention, the pivoting equipment for folding and unfolding the hinged floats will be explained in greater detail. Turning now to FIGS. 12 and 13 there are again shown three floats 1, 2 and 3 in enlarged cross section. FIG. 12 illustrates the collapsed or folded position of the floats during overland transport. FIG. 13 illustrates the unfolded position to establish a platform.

Hinges 15 are provided for pivotally linking floats 1 and 2, and other hinges 15 link floats 2 and 3. Looking particularly now to the linking of floats 1 and 2, each of the floats is provided with a slot or recess 22 and 23, respectively, for receiving the linkage means, particularly hydraulic actuators. When the two floats are in a folded or collapsed position, slots 22 and 23 form a continuous opening, i.e., they cover each other to form a cavity which extends through both floats. The linkage means includes a hydraulic control piston and cylinder arrangement 13 positioned in slot 22 of principal float 1. Another similar hydraulic unit 14 is located in slot 23 of auxiliary float 2. 24 and 25, respectively, denote bearing blocks for pivotally positioning one end each of the hydraulic unit 13 and 14. For example, the respective piston rods can be pivotally linked to these bearing blocks.

The linkage includes, in addition, a hinged support 16 which is pivotable about the hinge axis of hinge 15 and is in fact journalled to that hinge for independent pivot motion. The hinged support 16 has a T-shaped configuration. The two cylinders of the hydraulic linkages 13 and 14 are, respectively, pivotably linked to the ends of the crossbar of the T. The bottom of the stem of the T is the point of hingedly mounting support 16 to hinge 15.

The hinged support 16 is dimensioned and constructed so that the longitudinal axes of control units 13 and 14, i.e., the axes of relative piston-cylinder displacement intersect the axis of hinge 15. When the floats are folded down, as shown in FIG. 12, the axes of units 13 and 14 intersect the stem of the T at a point in between the crossbar of the T and the axis of hinge 15 so that a sufficiently long lever arm remains. In other words, the direction of actuation of the piston in actuator 13, for example, is never in line with an imaginary line between the axis of hinge 15 and the pivot point for actuator 13 on one end of the crossbar of the T. This is not only true in the folded down position, but during unfolding the angle between these two lines increases.

In the folded position of the floats the geometry can also be explained differently. The pivot points where the cylinders of hydraulic linkage 13 and 14 are linked to the crossbar of the T and the hinge point at the bottom of the stem thereof (axis of hinge 15) form a triangle with equal legs and apex at the bottom of the stem of the T. That triangle is thus defined by intersection of the three pivot axes involved and in a plane normal to the hinge axis. The apex angle of this triangle is now selected to be smaller than the smallest angle between the actuating axes of the hydraulic devices 13 and 14 in any of the actuating positions and measured along an arc which avoids that stem of the T.

The T-shape was selected for reasons of improved construction so that the linkage between the crossbar of the T on the one hand and the hydraulic units 13 and 14 on the other hand can be chosen rather simply.

If the floating arrangement is to be unfolded (transition from FIG. 12 to FIG. 13) and particularly, if auxiliary float 2 is to be folded up, to swing around the axis of hinge 15, at first hydraulic unit 13 is actuated in that the piston is displaced in the actuator 13. The piston displacement causes the two anchoring points of piston rod and cylinder to recede from each other. Thereupon torque is applied to element 16 to pivot around the axis of hinge 15 thereby carrying float 2 along for pivoting around the hinge axis. Piston-cylinder unit 13 can actually pivot the float 2 by 90°, i.e., until hinged support 16 is in upright position. The control piston and piston rod of unit 13 have then assumed the most extended position.

In the next step, piston and piston rod of hydraulic unit 14 are moved to their respective extended position which in effect causes another pivoting by 90° as between support 16 and float 2, but the hinged support 16 is held in the vertical positions by operation of the now immobilized hydraulic unit 13. Thus, it is float 2 which is in effect pivoted, again by 90° and to the final position as illustrated in FIG. 13. Reference numerals 17 and 18 denote the sides, respectively, of floats 1 and 2 which are exposed when the entire floating arrangement is in collapsed position. These two sides become juxtaposed after unfolding, to bear against each other when the floats are positioned side by side to form a floating platform.

The unfolding of auxiliary float 3 relative to auxiliary float 2 is carried out in exactly the same manner as the equipment is the same as described. Actually this unfolding can be carried out concurrently with or at least partially overlapping with the unfolding of floats 1 and 2.

For collapsing the floating arrangement and folding the several floats down, the pistons of the hydraulic units are operated from the respective other side in the cylinders to retract toward the positions shown in FIG. 12. The rather weak pulling force of the piston, however, is not detrimental because in the extended position the effective lever arm in relation to the axis of hinge 15 is larger in the first phase of folding, than in the first phase of unfolding. As can be seen by comparing FIGS. 12 and 13, the point of intersection of the actuating axis, for example, of hydraulic unit 13 moves away from hinge point at hinge 15 as the assembly unfolds to increase the effective lever arm.

The folding equipment is designed so that in each phase of folding or unfolding the floats run through a succession of different angular positions which are controlled in each instant as each angular position of two floats is governed and described by the respective particular positions of the pistons in hydraulic control units 13 and 14. As each control and actuating unit acts always upon a lever arm, the piston stroke of each hydraulic unit can be relatively small, and there is little danger of bending.

The invention is not limited to the embodiments described above but all changes and modifications thereof not constituting departures from the spirit and scope of the invention are intended to be included.

We claim:
1. Collapsible floating structure, comprising:
    a plurality of floats each contoured as parallelepiped, each having flat largest upper and lower rectangular surfaces, all said surfaces defined by similar rectangles, each float further having a pair of smaller long sides and a pair of still smaller front sides, said plurality including a first, a second and at least one third float;
    first means for hinging the first float to the second float along juxtaposed edges, respectively, pertaining to long sides of the first and second float;
    second means for hinging one of the long side edge of the third float to the long edge of the second float diagonally opposite to the edge thereof coupled to the first float, so that floats can be stacked on respective upper and lower largest rectangular surfaces for a collapsed state of the structure and with flush long sides as they are hinged and can be unfolded so that the second float is in between the first and the third float, respectively, whereby long sides with hinged edges bear against each other;
    amphibious means including tractor means for overland driving as well as propelling through water, there being coupler means for releasably coupling the tractor means to a front side of the first float; and
    second amphibious means coupled to the respectively opposite front side of the first float for horizontal dispositioning of the largest rectangular surfaces of all floats for the collapsed state.

2. Floating structure as set forth in claim 1, the front sides of the second and third floats being provided with couplers for selective coupling to the amphibious means.

3. Floating structure as set forth in claim 1 wherein long sides of the first and third floats not having edges coupled to the first or second means, are provided with couplers for coupling to another, similar floating structure.

4. Floating structure as set forth in claim 1, including pivotable ramp planks mounted along edges to the unhinged long side of the third float, there being recesses in the third float displaced from the central portion of the upper surface thereof for receiving the planks when folded back, the planks when unfolded providing a continuing surface for the central portion of the upper surface of the third float.

5. In a floating structure as in claim 1, the amphibious tractor having a single axis, there being actuating means for pivoting the tractor position on the coupler means about a vertical axis, relative to the first float the vertical axis running between the tractor and the first float.

6. In a floating structure as in claim 5, the tractor having a retractable auxiliary wheel for steering.

7. In a floating structure as in claim 1, the floats being filled with a hard plastic foam having closed pores and low density.

8. In a floating structure as in claim 1, the amphibious means having chambers filled with hard plastic foam having closed pores and low density.

9. Floating structure as set forth in claim 1 including first and second actuating means, cooperating with the first and second means for folding and unfolding the first and second float and the second and third float, respectively.

10. Floating structure as set forth in claim 9, each of the first and second actuating means including a first and second hydraulic actuator means respectively disposed in the first and second floats and in the second and third float each first and second hydraulic actuator means having first and second axes of action;

first and second hinged supports respectively pivotally mounted coaxial with the hinging as provided by the first means and second means and pivotally coupled to the respective first and second hydraulic means thereof for respectively pivoting the first and second floats and the second and third floats relative to each other in each case, the first and second axis of action in each case having nonzero angle respectively to the lines between the respective hinge axis and the respective pivot points of linking the respective first and second actuator means to the respective hinged support.

11. In a floating structure as set forth in claim 1, there being a first and a second recess, respectively, in the first and second float, first and second hydraulic means, respectively, disposed in the first and second recesses, each including piston and cylinder, one of the piston and cylinder of the first hydraulic means being pivotally connected to the first float in the first recess thereof and at a point remote from the long side of the first float having the edge along which the first means hinges the first float to the second float;

one of the piston and cylinder of the second hydraulic means being pivotally mounted to the second float in the second recess thereof and at a point remote from the long side of the second float having the edge along which the first means hinges the second float to the first float; and a hinged support, hinged to the first and second float coaxially with the first means and pivotally connected to the other ones of the pistons and cylinders of the first and second hydraulic means.

12. In a floating structure as set forth in claim 11 the hinged support having three axes, the hinge axis of the first means and first and second pivot axes, respectively, of the pivot connection to the first and second hydraulic means, the axes defining a triangle with equal legs in a plane normal to the hinge axis, the apex of the triangle being at the hinge axis, the first and second hydraulic means linked to the hinged support at the other points of the triangle, and defining directions of actuation oriented at an angle larger than the apex angle of the triangle, when the first and second bodies are folded together.

13. In a floating structure as in claim 12, the hinged support being a T-shaped member, the bottom of the stem of the T being traversed by the hinge axis.

14. Floating structure as set forth in claim 1, the tractor means amphibious and the second amphibious coupled to the first float for suspending the first float in horizontal position between them and as to its largest rectangular surfaces.

References Cited

UNITED STATES PATENTS

| | | | |
|---|---|---|---|
| 2,321,677 | 6/1943 | Higgins | 14—27 UX |
| 2,636,197 | 4/1953 | Odot | 14—27 |
| 3,010,128 | 11/1961 | Gillois | 14—27 X |
| 3,083,665 | 4/1963 | Steidley | 14—27 X |
| 3,152,569 | 10/1964 | Gehlen | 14—27 X |
| 3,324,583 | 6/1967 | Harris | 94—44 UX |

FOREIGN PATENTS

| | | | |
|---|---|---|---|
| Ad. 68,676 | 1/1958 | France | 14—27 |

JACOB L. NACKENOFF, Primary Examiner

U.S. Cl. X.R.

14—1